(12) United States Patent
Makram-Ebeid et al.

(10) Patent No.: US 7,738,724 B2
(45) Date of Patent: Jun. 15, 2010

(54) IMAGE VIEWING SYSTEM AND METHOD FOR GENERATING FILTERS FOR FILTERING IMAGE FEATURES ACCORDING TO THEIR TYPE

(75) Inventors: Shérif Makram-Ebeid, Dampierre (FR); Raoul Florent, Ville d'Avray (FR)

(73) Assignee: Koninklijke Philips electronics N.V., Eindhoven (NL)

( * ) Notice: Subject to any disclaimer, the term of this patent is extended or adjusted under 35 U.S.C. 154(b) by 789 days.

(21) Appl. No.: 10/544,204

(22) PCT Filed: Feb. 3, 2004

(86) PCT No.: PCT/IB2004/000304

§ 371 (c)(1),
(2), (4) Date: Aug. 2, 2005

(87) PCT Pub. No.: WO2004/070658

PCT Pub. Date: Aug. 19, 2004

(65) Prior Publication Data

US 2006/0132655 A1     Jun. 22, 2006

(30) Foreign Application Priority Data

Feb. 7, 2003    (EP) .................................. 03290319

(51) Int. Cl.
*H04N 5/14*     (2006.01)
*H04N 9/64*     (2006.01)

(52) U.S. Cl. ....................... 382/260; 348/571
(58) Field of Classification Search ................. 348/571; 382/260
See application file for complete search history.

(56) References Cited

U.S. PATENT DOCUMENTS 5,805,236 A * 9/1998 Roth ........................... 348/571

7,272,265 B2 * 9/2007 Kouri et al. ................. 382/260
2002/0181797 A1 * 12/2002 Young ........................ 382/260
2003/0026495 A1    2/2003 Gondek et al.

OTHER PUBLICATIONS

H. Knutsson, et al: A Framework for Anisotropic Adaptive Filtering and Analysis of Image Sequences and Volumes, vol. 3, Mar. 1992, pp. 469-472, CA, USA.

* cited by examiner

*Primary Examiner*—Bhavesh M Mehta
*Assistant Examiner*—Stephen R Koziol

(57) ABSTRACT

Image processing system for generating a multidimensional adaptive oriented filter to be applied to the point intensities of a d-dimensional image, comprising analyzing means with means (5, fi) to estimate at each image point a probability measure (Fi) of the presence of a type of feature of interest and a weighting control model (10) issuing a weighting control vector (11, VC) constructed from said probability measure, for the user to control synthesized adaptive kernels at each image point; and synthesizing means for generating the filter kernels at each image point adapted to the type of the features of interest, whose filtering strength is controlled by the weighting control vector. The system may comprise a selection unit (40) for the user to select synthesizing means for generating "pre-mixing filtering means" comprising combining means (30, XH) dependent on the type of the image features having inputs for the weighting control vector (11, VC) and the image data [I(x)] and having an aspect for weighted adaptive kernels (35, H) adapted to the type of the image features to produce the filtered image signal [H(x)], and/or "post-mixing filtering means" comprising both isotropic and anisotropic filtering means [15, gi)] applied independently of the type of the image features, whose outputs (Gi) are combined at each image point and adapted using the weighting control vector (11, VC) to produce the filtered image signal [G(x)].

17 Claims, 2 Drawing Sheets

IMAGE VIEWING SYSTEM AND METHOD FOR GENERATING FILTERS FOR FILTERING IMAGE FEATURES ACCORDING TO THEIR TYPE

FIELD OF THE INVENTION

The invention relates to an image processing system and an image processing method to generate adaptive filters, whose supports are adapted to the type of features of interest in an image to be processed. The invention more particularly relates to such processing system and method that are applied to medical images. The invention also relates to a medical examination apparatus having such an image processing system and means for display. The invention finds an application in the industry of image processing systems and medical examination apparatuses.

BACKGROUND OF THE INVENTION

A method to smooth and filter images is disclosed in the publication "A Framework for Anisotropic Adaptive Filtering and Analysis of Sequences and volume" in IEEE International Conference on Acoustics, Speech and Signal Processing (ICASP); San Francisco Mar. 23-26, 1992; p. 469-472, vol. 3, by H. Knutsson, L. Haglund and G. H. Granlund. The approach described in the cited publication makes use of quadrature and steerable filters having a set of different orientations including at least three different orientations in the case of 2-D image processing, and at least six different orientations in the case of 3-D image processing. The algorithm written from this approach requires the application of all the filters involved in the filtering of one image. The resulting algorithm complexity has been found to be high. So, the calculation time is particularly long.

SUMMARY OF THE INVENTION

The present invention has for an object to provide an image viewing system having processing means to generate an adaptive filter for filtering an image comprising features of different type. By type of the image features, it is to be understood either anisotropic features such as features having elongated oriented shapes or isotropic features such as features rather showing circular or spherical shapes. In particular, it is an object of the invention to provide an image viewing system having analysis means for analyzing the content of a noisy image representing various objects and for determining the type of the features of interest of the objects in the image; and having synthesis means for synthesizing filters whose supports are adapted to processing the different features according to their different types, for filtering noise or enhancing these features in the image.

It is an object of the invention to provide analyzing means to estimate at each image point a probability measure of the presence of a feature of interest; then, from said probability measure, to determine a weighting control model for the user to control adaptive kernels at each image point.

Such an image viewing system is claimed in claim 1.

It is a further object of the invention to yield synthesizing means to provide the user with filtering means, among which:
  first filtering means called "pre-mixing filtering means" comprising combining means dependent on the type of the image features having inputs for the weighting control means and the image data and having an output for weighted adaptive kernels adapted to the type of the image features; and/or
  second filtering means called "post-mixing filtering means" comprising both isotropic and anisotropic filtering means applied independently of the type of the image features, whose outputs are combined at each image point and adapted using the weighting control means.

A characteristic of the system of the invention is that at each point, the oriented filter means and the isotropic filter means are mixed according to the degree of feature type present at each point, such as for example the degree of anisotropic type and isotropic type of said point. Several problems are solved during those two phases of analysis and synthesis:

The analysis is simplified however taking into account different kinds of information such as feature orientation and feature dimensions. The control means provided to the user allows him to fully specify the type of the features that he wishes to enhance. It allows him to fine-tune the filter in an extremely fast way, i.e. much faster than the actual filtering time.

The solution to these problems is based on:

The use of the control model based on the estimation of a vector $(F_1, \ldots F_m)^T$ of the pixel-level probabilities of the presence in the image of a number m of features of interest. This feature probability vector is captured by a set of m operators $f_1, \ldots f_m$. The design of those operators depends on the type of the features to be captured.

The control model is completed by an explicit user-driven combination means $X_u$ of the feature probabilities into a k-dimension control vector $(c_1, \ldots, c_k)^T$. This combination specifies the user's wishes in terms of: "which feature or feature combination should be enhanced and with what strength".

Selector means may be used to select filtering means chosen among two chains of proposed filtering means. The first filtering chain, called "pre-mixing filtering means", starts from the real-time image and produces an output signal $R_H$ using a real-time adaptive-enhancing filter kernel H. The definition of this kernel H is specified by the above defined combined control vector $(c_1, \ldots, c_k)^T$ using a combination operator $X_H$. The second filtering chain, called "post-mixing filtering means", comprises a combining operator $X_g$, which combines the outputs of m predefined adaptive-enhancing filters $g_i$ and produces an output signal Rg. Each of these m predefined adaptive-enhancing filters $g_i$ is dedicated to the enhancement of a specific feature. Their combination is also driven by the control vector $(c_1, \ldots, c_k)^T$ via the combination operator $X_g$. This chain allows extremely fast tuning of the filter by the user since the adaptive filters $g_1, \ldots, g_n$ are computed independently of the user tuning. Only the combination operator $X_g$ needs to be recomputed at every new control adjustment.

The system of the invention has very powerful means to constitute adaptive filters for filtering features of different types such as anisotropic oriented features or isotropic areas. These filtering means show very low complexity of calculation, resulting in substantial computation saving. In addition, the synthesis means of the system of the invention gives to the user the choice between first filtering means and second filtering means whose complexities are different and whose computation loads are also different. Besides, the computations means according to the invention can be efficiently implemented using very simple techniques. Another advantage of the system of the invention is that the required computation time of the second filtering means is especially short. This system of the invention can constitute a very fast and general multidimensional adaptive filter.

The second embodiment of the system of the invention can be implemented so that it is minimally demanding in terms of input/output, thus making a very good filter candidate for general purpose processor implementation. In fact, the system of the invention presents the advantage that it does not require any memory means. Since at the present time, processing means are very efficient for producing results of calculations, but are not very efficient for extracting data from memories, hence, the system of the invention, which only comprises calculation means, is very efficient.

In these advantageous embodiments of the invention, the user disposes of control means for interacting with the analysis means to select the weight to be applied to the filtering of the features of interest in the image and/or to the synthesis means.

The invention may refer to image data in which each data point (pixel or voxel) is attributed a single scalar intensity value. This can be extended to multi-spectral data in which several values are attributed to each data point. For example, in colored images, one may refer to Red, Green and Blue components. Multidimensional data can be dealt with, such as one dimension, spatial 2-D, spatial 3-D, spatial multidimensional data plus intensity dimensional data and/or plus time dimensional data. When one of the dimension is time and when one aims at real-time results, the method of the invention may have recursive steps for using data recorded at previous instants.

BRIEF DESCRIPTION OF THE FIGURES

The invention is described hereafter in detail in reference to diagrammatic figures, wherein.

DESCRIPTION OF EMBODIMENTS

The invention relates to an image viewing system having processing means to generate filters whose supports are adapted according to local type of features of interest in an image to be processed. The invention relates to such a system for adaptive filtering of multidimensional signals for quality improvement application including noise reduction and the enhancement of valuable details. This system has processing means for achieving this goal in two steps: first means for signal analysis and, using the results of this analysis, second means for filter synthesis. In particular, the invention relates to an image viewing system having analysis means for analyzing the content of a noisy image representing various objects, in order to determine the type of features of interest in an image; and having synthesis means for synthesizing filters with adapted supports apt to filter noise or enhance the features of different type in the image. The analysis means analyses the image signal in order to determine local properties of the image to be filtered. The synthesis means realizes a filtering kernel, which varies at for each current point of the image and is adapted to the local properties of the image signal, while scanning the different points of the image during the filtering process.

The system comprises means of acquisition of image data including point coordinates, denoted by x, and an intensity value, denoted by I(x), for each image point x. The proposed system deals with a multi-dimensional image, whose dimension is denoted by d. It is not excluded that d=2. For a d-dimensional image, each data point is defined by a d-tuple point x associated to coordinates of the form $(x_1, x_2, \ldots x_d)$ where each of the components $x_1, x_2, \ldots x_d$ varies in a predefined range, for instance $0 < x_1 < I_1$; $0 < x_2 < I_2$; $0 < x_d < I_d$. To each such d-tuple, corresponds an image value, which may be a single scalar value. In the case of a monochromatic image, the scalar value is the luminance intensity. For a color image, the image value may be represented by a set of three intensities representing the Red, Green and Blue components.

Figure 1:
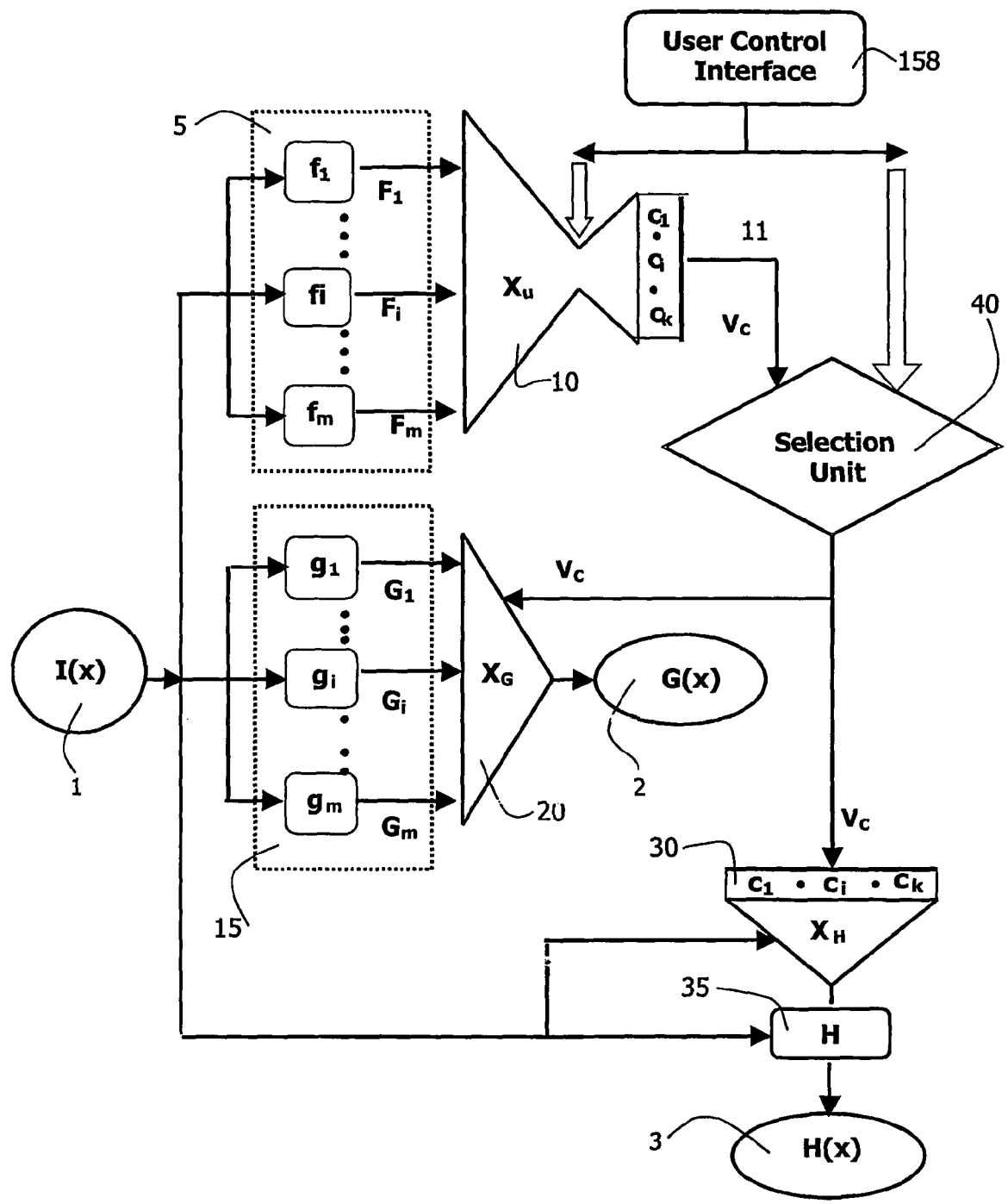
FIG. 1 is a functional block diagram illustrating the means of the image viewing system.

FIG. 1 is a block diagram of the image processing system of the invention. Referring to FIG. 1, the input image data I(x) are processed using the following processing means:

1) Analysis Means for Analyzing the Content of the Original Image.

The Analysis means comprises a bank of a number m of operators, denoted by $f_1, \ldots, f_i, \ldots, f_m$ and referenced 5 in FIG. 1. The bank 5 estimates at each current point of the image a probability of presence of features of interest. As feature of interest, one is to understand either an anisotropic feature which is an elongated oriented feature, such as for example in a displayed medical image representing vessels, an edge or a border of a vessel; or an isotropic feature which may be rather a circular or spherical feature, such as an aneurysm or a vessel perpendicular to the plane of the displayed image.

More generally, for a 2-D image signal, anisotropic features might include crest, valleys, crest intersections, pass, plateau borders. It is to be noted that these typologies (crest, valleys, etc. . . . ) refer to 2-D image signals where the intensity of the 2-D image is represented in a third dimension. Hence, the intensity is figured out as the height dimension in a landscape. Isotropic features might be "flat" isotropic areas, where flat means having constant intensity in the height dimension. For a 3-D image signal, the features might even be more diverse, including surfaces oriented in any directions, and 3-D planar or non-planar (skew) curves.

The outputs of the bank of operators 5 are formed by a number m of probability values, denoted by $F_1, \ldots, F_i, \ldots, F_m$, for the m types of different features to be present in the image to be filtered.

In an example, in an image, two types of features may be present, such as edges and isotropic areas. The probability of presence of edges is expressed by $\alpha$, and the probability of presence of isotropic areas is expressed by $(1-\alpha)$.

In another example, in an image, three types of features may be present, such as edges, edge intersections, and isotropic areas. The probability of presence of simple edges is expressed by $\alpha$ (alpha), and the probability of presence of isotropic areas is expressed by $\beta$ (beta), and the probability of presence of edge intersections is expressed by $\gamma$ (gamma). The total probability value is preferably normalized so that:

$$\alpha + \beta + \gamma = 1. \tag{1}$$

The general formula giving the probability of presence of different features may be expressed by:

$$\sum_{i=1}^{i=m} F_i = 1 \tag{2}$$

The type of the operators of the bank 5 depends on the type of the features of interest. It is not the object of the invention to specify these types very strictly. In the above described case when edges and isotropic areas may be found as features in the image, the probability α of presence of edges can be determined for example by calculating the intensity gradient at each point in the image.

Hence, according to the invention, a number m of features of different type are found in the image using a corresponding number m of operators 5 that depends on the type of the features.

A combining operator 10, called user operator, denoted by $X_u$, further receives at its input the m probabilities $F_i$ of presence of features of different type and provides at its outputs a control vector of k components $C_1, \ldots, C_i, \ldots, C_k$. This control vector 11 of k components, denoted by $V_c$, allows to controlling the adaptive kernels of the filter to be constructed according to the invention. The number k of vector components is such that m≧k, depending on whether the user wants to group the filtering of different types of features together or not. Using this control vector $V_c$, the user will be able to define the feature or the group of features that he wants to filter or to enhance and the strength of the filtering or enhancement. For instance, in the above-described example of an image comprising edges and circular features, the user may choose to enhance the isotropic features with strength of 0.8 and the anisotropic features with strength of 0.2.

Hence, the analyzing means provides the control vector $V_c$, which is apt to control the adaptive kernel to be passed on each point in the image. It is to be noted that this control vector depends on the type of the features and not on the direction of particular features such as the direction of anisotropic features.

2) Synthesis means for Synthesizing Oriented Filters.

The synthesis means comprises two possible chains of means for generating an adaptive filter. The first chain is denoted by H and called "pre-mixing filtering chain of generating adaptive filter". The second chain is denoted by G and called "post-mixing filtering chain of generating adaptive filer". The user has means 158 called user control interface, for selecting the first or the second chain.

2.1) Pre-Mixing Filtering Chain of Generating Adaptive Filter.

This chain comprises a combining operator denoted by $X_H$, referred to as 30, which receives at its input, the control vector $V_c$ and the image data I(x) and which provides at its output an adaptive kernel. This adaptive kernel is adapted to the orientation of the anisotropic oriented features and/or to the dimensions of the isotropic features to be filtered or enhanced. In addition, this adaptive kernel is adapted to respect the weighting parameters defined by the control vector $V_c$, since $V_c$ is used on top of orientations and/or dimensions of the features.

Those skilled in the art know means to synthesize a filter defined by a probability such as α and by structure tensors. A map of the α probabilities defines the moments of a target tensor. From the target tensor, a filter is synthesized where the tensor eigen vectors give the local orientation and where the tensor eigen values give indications of the strength in the different orientations. Hence, the information of strength along different directions that are given by the control vector may be used to control a tensor. According to the invention, a tensor is synthesized, in order to detect anisotropic or isotropic features, so that it is aligned on a local tangential direction.

In an example, the number m of features of the image is m=2, the first feature correspond to $F_1$, and the second feature to $F_2$. The tensor is defined by a tangential moment $\mu_t$ and by a perpendicular moment $\mu_p$. The minimum and maximum moment are respectively $\mu_{MIN}$ and $\mu_{MAX}$. The moment are given by the following formulae:

$$\mu_t = \mu_{MIN} + \alpha(\mu_{t\,MAX} - \mu_{MIN}) \tag{3a}$$

$$\mu_p = \mu_{MIN} + \alpha(\mu_{p\,MAX} - \mu_{MIN}). \tag{3b}$$

$$\text{when } \alpha = 0, \mu_t = \mu_p = \mu_{MIN} \tag{4}$$

hence the tensor is isotropic since the strength is the same in the directions t and p.

$$\text{When } \alpha = 1, \mu_t = \mu_{t\,MAX}, \tag{5a}$$

and $$\mu_p = \mu_{p\,MAX} \tag{5b}$$

hence the tensor is completely oriented.

With the above-defined tensor, the filter can be realized: this filter will clearly depend on the type of the features that are present in the image and that the user wants to favor. In this chain of filter generation, the information about the type of features is mixed to perform the generation of the filter kernel H referred to as 35. The result 3 of the filtering is given by H(x).

2.2) Post-Mixing Filtering Chain of Generating Adaptive Filter.

In this second chain of filter generation, instead, the image data are first filtered using a bank 15 of a number m of different filtering means denoted by $g_1, \ldots, g_i, \ldots, g_m$. The number of these filtering means corresponds to the number m of features of different type to be processed. The outputs, denoted by $G_1, \ldots, G_i, \ldots, G_m$, of the different filtering means are mixed. Each different filtering operation relates to a given identified feature. In this chain, adaptive or non-adaptive filters are used. Each of these filters is specialized in the filtering of one given type of feature, that has been previously identified, such as edges, intersections and circular or spherical features.

The combination of the outputs of the filters of the bank 15 is performed using a combination operator $X_G$. This combination operator $X_G$, referred to as 20, also receives the control vector $V_c$ of the k components $C_1$ to $C_k$.

For instance, the combination may be a simple weighted sum of the results of the filter bank 15. This combination operator $X_G$ is very important element of this chain, because it allows to changing very easily the weights related to the different type of features in the final result 2 denoted by G(x), whichever are the filtering means of the bank of filters 15. The filtering means of the bank 15 are applied independently of the types of the features examined in the image. The filtering operations using the bank 15 are realized in a preliminary step and the weight variations are performed while combining the results $G_1, \ldots, G_i, \ldots, G_m$, by using the control vector $V_c$.

In an example, an image comprising anisotropic features and isotropic features can be filtered using two types of filters denoted by $g_1$ and $g_2$ in the bank of filters 15. $G_1$ is for example the output of the oriented filter $g_1$ and $G_2$ is the output of the isotropic filter $g_2$. The filter $g_2$ is not necessarily adaptive, it may be a simple Gaussian kernel. The user may choose a filtering strength for the anisotropic features given by α. In this case, the result at the output of the combining operator $X_G$, referred to as 20, is given by the formula:

$$G(x) = \alpha(x) G_1(x) + (1 - \alpha) G_2(x) \tag{6}$$

Since the value α(x) depends on the choice of the user, the user can change the result G(x) according to its desire to improve the filtering strength or to improve the enhancement of the different types of features. This operation of varying the filtering strength can be achieved without performing any new calculation of the results $G_1, \ldots, G_i, \ldots, G_m$ of the different filters $g_1, \ldots, g_i, \ldots, g_m$ of the bank of filters 15.

In an example of realization, the oriented filter $g_1$ can be made using structure tensors with:

$$\mu_t = \text{a constant} \tag{7a}$$

and $$\mu_p = \text{another constant}. \tag{7b}$$

It is to be noted that the isotropic filter $g_2$ does not depend on $\mu_t$ or $\mu_p$ values.

3) Image Processing Method.

Figure 2:
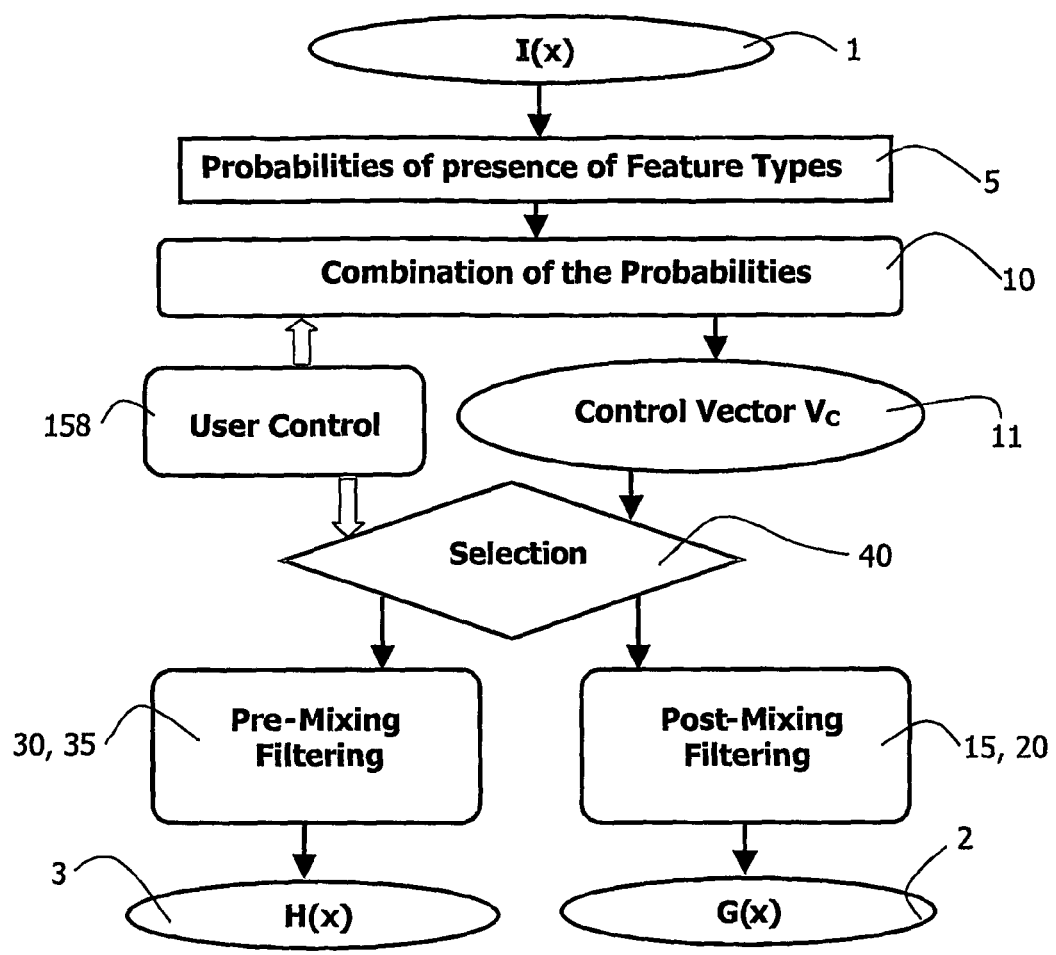
FIG. 2 illustrates the steps carried out by the viewing system of the invention.

Referring to FIG. 2, the image processing method, for generating a multidimensional adaptive oriented filter to process image data in a number d of dimensions, operated by the above-described system comprises steps of:

analyzing (5, $f_i$) the image to estimate at each image point a probability measure ($F_i$) of the presence of a type of feature of interest and to determine from said probability measure a weighting control model (10) yielding a weighting control vector (11, $V_c$) for the user to control synthesized adaptive kernels at each image point; and synthesizing filter kernels at each image point adapted to the type of the features of interest, which filter kernels are controlled by the weighting control vector.

The user may select a chain of steps for generating the filter kernels called "pre-mixing filtering chain of steps", comprising a combination operation (30, $X_H$) dependent on the type of the image features for combining the weighting control vector (11, $V_C$) and the image data [$I(x)$] and yielding weighted adaptive kernels (35, H) adapted to the type of the image features to produce the filtered image signal [$H(x)$].

The user may select another chain of steps for generating the filter kernels called "post-mixing filtering chain of steps", comprising performing different types of filtering operations [15, $g_i$)], such as isotropic and anisotropic filtering operations, applied independently of the type of the image features. These filtering operations yield signals ($G_i$) that are further combined, at each image point of the image, using the weighting control vector (11, $V_C$), in order to produce the filtered image signal [$G(x)$] adapted to the types of features.

4) Medical Viewing System and Apparatus

Figure 3:
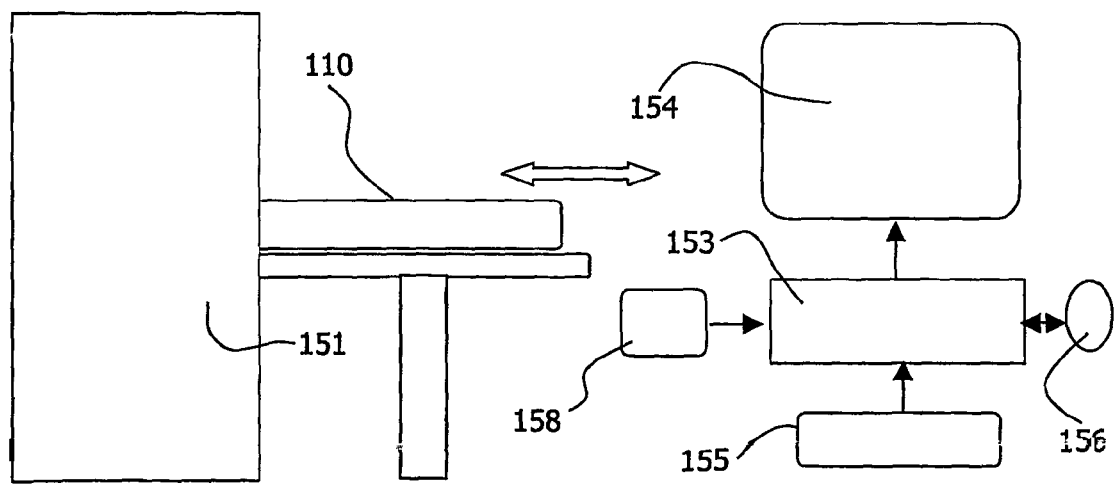
FIG. 3 is a functional block diagram of a viewing system and a medical apparatus according to the invention.

The above-described means and steps can be implemented in the viewing system of the invention. FIG. 3 shows the basic components of an embodiment of an image viewing system in accordance to the present invention, incorporated in a medical examination apparatus. The medical examination apparatus 151 may include a bed 110 on which the patient lies or another element for localizing the patient relative to the imaging apparatus. The medical imaging apparatus 151 may be a CT scanner or other medical imaging apparatus such as x-rays or ultrasound apparatus. The image data produced by the apparatus 151 is fed to data processing means 153, such as a general-purpose computer, that carries out the steps of the method. The data processing means 153 is typically associated with a visualization device, such as a monitor 154, and an input device 155, such as a keyboard, or a mouse 156, pointing device, etc. operative by the user so that he can interact with the system. The data processing device 153 is programmed to implement a method of processing medical image data according to invention. In particular, the data processing device 153 has computing means and memory means to perform the steps of the method. A computer program product having pre-programmed instructions to carry out the method may also be implemented.

The drawings and their description herein before illustrate rather than limit the invention. It will be evident that there are numerous alternatives that fall within the scope of the appended claims. Moreover, although the present invention has been described in terms of generating image data for display, the present invention is intended to cover substantially any form of visualization of the image data including, but not limited to, display on a display device, and printing. Any reference sign in a claim should not be construed as limiting the claim.

The invention claimed is:

1. An image processing system for generating a multidimensional adaptive oriented filter to be applied to point intensities of an image formed in a number d of dimensions, comprising:

one or more processors programmed to:
estimate at each image point a probability measure (Fi) of a presence of a type of image feature of interest which can be an elongated anisotropic feature or a generally circular or spherical isotropic feature;
determine from said probability measure a weighting control model yielding a weighting control vector for a user to control synthesized adaptive kernels at each image point; and
generate adaptive filter kernels at each image point adapted to the type of the image feature of interest, which adaptive filter kernels are controlled by the weighting control vector.

2. The image processing system of claim 1, wherein the one or more processor(s) is further programmed to:
generate weighted adaptive filter kernels adapted to the type of the image features of interest based on the weighting control vector and image data (I(x)) to produce a filtered image signal (H(x)).

3. The image processing system of claim 1, wherein the one or more processor(s) is further programmed to:
apply both isotropic and anisotropic filters (gi) independently of the type of the image features of interest;
combine outputs (Gi) of the applied isotropic and anisotropic filters at each image point; and
use the weighting control vector to produce a filtered image signal (G(x)).

4. The image processing system of claim 1, wherein the one or more processor(s) is further programmed to:
apply a number m of operators (f1, . . . , fi, . . . , fm), at each current point of the image to output probability measure (F1, . . . , Fi, . . . , Fm) of a presence of the image features of interest among m types of different image features to be filtered.

5. The image processing system of claim 4, wherein the one or more processor(s) is further programmed to:
apply a combining operator which receives at its input the probability measures (F1, . . . , Fi, . . . , Fm) of the presence of the different types of the image features for forming a weighting control model and provides at its outputs k components (C1, . . . , Ci, . . . , Ck) of the weighting control vector, for controlling the adaptive filter kernels.

6. The image processing system of claim 1, wherein the features of interest are chosen among anisotropic features and isotropic features.

7. The image processing system of claim 6, wherein the one or more processor(s) is further programmed to:

apply a combining operator which receives at its input, the weighting control vector and image data I(x) and which provides at its output an adaptive kernel that is adapted to an orientation of the anisotropic oriented features and/or to dimensions of the isotropic features to be filtered or enhanced by the weighting parameters defined by the weighting control vector in a pre-mixing filtering operation.

8. The image processing system of claim 6, wherein the one or more processor(s) is further programmed to:

apply a number m of different post-mixing filters (g1, ..., gi, ..., gm), which are applied independently of the types of the image features examined in the image, whose number m corresponds to the number m of image features of different types to be processed; and mix outputs (G1, ..., Gi, ..., Gm) of the post-mixing filters with a combination operator which is controlled by the weighting control vector to produce a filtered image signal (G(x)).

9. The image processing system of claim 8, wherein the combination operator is a weighted sum of results of applying the different post-mixing filters (g1, ..., gi, ..., gm).

10. The image processing system of claim 8, further including:

a user control interface by which a user controls weighting parameters (C1, ..., Ci, ..., Ck) of the weighting control vector, selects pre-mixing filters and/or the post-mixing filters, a strength of filtering or enhancement related to the types of image features of interest (a) at the output of the combination operator which combines the outputs (G1, ..., Gi, ..., Gm) to produce the filtered image signal (G(x)) and/or (b) at the input of a combination operator in a pre-mixing filter.

11. An image processing method for generating a multidimensional adaptive oriented filter to be applied to point intensities of an image formed in a number (d) of dimensions, the method comprising:

estimating at each image point a probability measure of a presence of a type of feature of interest which can be an elongated anisotropic feature or a generally circular or spherical isotropic feature;

determining from said probability measure a weighting control model yielding a weighting control vector for a user to control synthesized adaptive kernels at each image point;

generating filter kernels at each image point adapted to the type of the features of interest, which filter kernels are controlled by the weighting control vector; and displaying processed images on a display device.

12. A medical examination apparatus comprising:
means to acquire d-dimensional image data;
an image processing system for generating a multidimensional adaptive oriented filter to be applied to point intensities of an image formed in a number d of dimensions, comprising:

analyzing means comprising means to estimate at each image point a probability measure of a presence of a type of feature of interest which can be an elongated anisotropic feature or a generally circular or spherical isotropic feature and to determine from said probability measure a weighting control model yielding a weighting control vector for a user to control synthesized adaptive kernels at each image point; and synthesizing means for generating filter kernels at each image point adapted to the type of the feature of interest, which filter kernels are controlled by the weighting control vector;

a display system for visualizing processed images; and
user control means for selecting weighting parameters and/or acting on a user operator and/or a selection unit.

13. A computer program product comprising a set of instructions for carrying out a method of image processing for generating a multidimensional adaptive oriented filter to be applied to point intensities of an image formed in a number of dimensions, the method comprising:

estimating at each image point a probability measure of a presence of a type of feature of interest which can be an elongated anisotropic feature or a generally circular or spherical isotropic feature;

determining from said probability measure a sweighting control model yielding a weighting control vector for a user to control synthesized adaptive kernels at each image point; and generating filter kernels at each image point adapted to the type of the features of interest, which filter kernels are controlled by the weighting control vector.

14. The image processing system as claimed in claim 1, further including:

a user control device by which a user selects weighting parameters.

15. The image processing system as claimed in claim 14 further including a medical imaging apparatus which acquires three-dimensional image data.

16. The image processing system as claimed in claim 14, further including:

a display system which visualizes processed images.

17. The method as claimed in claim 11, wherein the estimating, determining and generating steps are performed by one or more processors.

* * * * *